(12) United States Patent
Bleus et al.

(10) Patent No.: US 9,923,480 B2
(45) Date of Patent: Mar. 20, 2018

(54) DC-TO-AC POWER CONVERTER WITH HIGH EFFICIENCY

(71) Applicant: CE+T Power Luxembourg, Troisvierges (LU)

(72) Inventors: Paul Bleus, Jupille (BE); Fabrice Frebel, Wandre (BE); Thierry Joannes, Flémalle (BE); François Milstein, Liège (BE)

(73) Assignee: CE+T Power Luxembourg, Troisvierges (LU)

( * ) Notice: Subject to any disclaimer, the term of this patent is extended or adjusted under 35 U.S.C. 154(b) by 0 days.

(21) Appl. No.: 15/529,350

(22) PCT Filed: Nov. 12, 2015

(86) PCT No.: PCT/EP2015/076445
§ 371 (c)(1),
(2) Date: May 24, 2017

(87) PCT Pub. No.: WO2016/083143
PCT Pub. Date: Jun. 2, 2016

(65) Prior Publication Data
US 2017/0272000 A1    Sep. 21, 2017

(30) Foreign Application Priority Data

Nov. 24, 2014  (EP) .................................. 14194504

(51) Int. Cl.
*H02M 7/04* (2006.01)
*H02M 3/156* (2006.01)
(Continued)

(52) U.S. Cl.
CPC .............. *H02M 7/04* (2013.01); *H02M 1/08* (2013.01); *H02M 1/14* (2013.01); *H02M 3/156* (2013.01); *H02M 2001/0048* (2013.01)

(58) Field of Classification Search
CPC ............ H02M 1/08; H02M 1/12; H02M 1/14; H02M 7/04; H02M 7/797; H02M 7/493; H02M 2001/0007; H02M 2001/0048
See application file for complete search history.

(56) References Cited

U.S. PATENT DOCUMENTS 5,619,404 A * 4/1997 Zak ..................... H02M 1/4258
                                                              363/16
6,330,170 B1 * 12/2001 Wang ...................... H02J 9/062
                                                              363/17
(Continued)

FOREIGN PATENT DOCUMENTS

EP      2770624 A1    8/2014
JP      H11206133 A   7/1999

*Primary Examiner* — Yusef Ahmed
(74) *Attorney, Agent, or Firm* — Reinhart Boerner Van Deuren P.C.

(57) ABSTRACT

A DC-to-AC power converter (1) includes: a current-type DC-to-AC converter (70) having a first DC input (80) and a first AC output (85), said first DC input (80) being connected in parallel to said main DC input (10) and said first AC output (85) being connected in parallel to said main AC output (20); and a controller (110) for: controlling said bidirectional voltage-type DC-to-AC converter (50) for delivering at said first AC output-input (65) a sinusoidal AC voltage of said fundamental frequency $f_0$; controlling said current-type DC-to-AC converter (70) for delivering at said first AC output (85) a quasi square-type AC current of said fundamental frequency ID and in phase with said sinusoidal AC voltage; imposing that at least 70% of said rated current is provided by said current-type DC-to-AC converter (70).

10 Claims, 8 Drawing Sheets

(51) Int. Cl.
*H02M 1/14* (2006.01)
*H02M 1/08* (2006.01)
*H02M 1/00* (2006.01)

(56) References Cited

U.S. PATENT DOCUMENTS

| | | | | |
|---|---|---|---|---|
| 8,624,439 B2* | 1/2014 | Marcianesi | ............... | G05F 1/67 136/244 |
| 8,842,450 B2* | 9/2014 | Jungreis | ............... | H02M 3/285 363/21.03 |
| 9,093,917 B2* | 7/2015 | Ho | ............... | H02M 1/4208 |
| 9,397,580 B1* | 7/2016 | Alexander | ............... | H02M 3/1582 |
| 2005/0109749 A1* | 5/2005 | Karino | ............... | B23K 9/092 219/130.5 |
| 2006/0233000 A1* | 10/2006 | Akagi | ............... | H02M 5/4585 363/37 |
| 2007/0273338 A1* | 11/2007 | West | ............... | H02M 1/12 323/222 |
| 2008/0062724 A1* | 3/2008 | Feng | ............... | H02J 7/35 363/17 |
| 2008/0198637 A1* | 8/2008 | Meysenc | ............... | H02M 7/219 363/67 |
| 2009/0236917 A1* | 9/2009 | Bettenwort | ............... | H02J 1/102 307/82 |
| 2010/0195361 A1* | 8/2010 | Stem | ............... | H02M 7/5387 363/132 |
| 2012/0044728 A1* | 2/2012 | Yatsu | ............... | H02M 7/219 363/126 |
| 2012/0268969 A1* | 10/2012 | Cuk | ............... | H02M 7/48 363/17 |
| 2013/0039104 A1* | 2/2013 | Sharma | ............... | H02M 1/10 363/123 |
| 2016/0072403 A1* | 3/2016 | Niwa | ............... | H02M 7/217 363/89 |
| 2016/0322910 A1* | 11/2016 | Kovacevic | ............... | H02M 3/33576 |
| 2017/0237334 A1* | 8/2017 | Kawashima | ............... | H02M 1/12 363/44 |
| 2017/0256953 A1* | 9/2017 | Nishimura | ............... | H02J 3/385 |
| 2017/0264206 A1* | 9/2017 | Rana | ............... | H02M 1/083 |

* cited by examiner

DC-TO-AC POWER CONVERTER WITH HIGH EFFICIENCY

FIELD OF THE INVENTION

The present invention relates to a DC-to-AC power converter. Typically such a DC-to-AC power converter has a main DC input and a main AC output and is able to convert and adapt a DC voltage at the main DC input into a sinusoidal AC voltage at the main AC output, and is able to deliver a rated current at the main AC output. It comprises in series a DC-to-DC converter followed by a bidirectional voltage-type DC-to-AC converter. A tank capacitor is connected in parallel to the DC output of the DC-to-DC converter.

TECHNOLOGICAL BACKGROUND AND PRIOR ART

DC-to-AC power converters are known by the one skilled in the art and are typically used in the telecommunication industry. For historical reasons, the loads in this industry indeed typically need an AC input voltage whereas the energy is often delivered by a battery that provides a DC voltage, while a battery as energy supplier is often chosen in low power applications.

FIG. 1 shows an example of a DC-to-AC power converter 1 known by the one skilled in the art. Such a converter is able to convert a DC voltage at its main input 10 into an AC voltage at his main AC output 20. As illustrated in FIG. 1, DC-to-AC power converters known by the one skilled in the art typically comprise a first DC-to-DC converter 30 that generally has two functions: firstly, adapting (e.g. increasing) a DC voltage provided by a battery connected at the main DC input 10; and secondly, galvanically isolating this low voltage battery, and so protecting it, from disturbances or faults coming from the main AC output 20. In order to achieve this second function, the first DC-to-DC converter 30 has to be isolated (see double strike). A tank capacitor 40 is typically connected in between the first DC-to-DC converter 30 and a DC-to-AC converter 50. This second converter 50 provides at the main AC output 20 the required sinusoidal AC voltage.

DC-to-AC power converters such as the one shown in FIG. 1 present different losses. As a consequence, the efficiency of such converters is not optimal.

Document JP 11 206133 A discloses a AC-to-AC power converter equipped with a current-type power converter and a voltage-type power converter. In the current-type power converter, a DC current outputted from a rectifier, converting an AC output to a DC current, is smoothed by a reactor and supplied to an inverter. The DC current is converted by the inverter to a 120° current flow square wave-type AC current by on-off control of a switching element of the inverter constituted of semiconductor elements. Thus the inverter circuit supplies a main current to a load, such as a 3-phase AC current to an induction motor. The voltage-type power converter is connected with the AC output terminal of the current-type power converter via a reactor, converts a DC voltage obtained from an input side capacitor to an AC voltage by on-off control of a switching element of an inverter constituted of semiconductor elements, and controls the current to be supplied to the load from the current-type power converter so as to obtain a sine wave. The output current phase of the current-type power converter is switched by the interphase voltage of the voltage-type power converter. The problem solved is to reduce power loss in semiconductor elements constituting an inverter circuit and current increase at the time of rapid change of a load.

Document EP 2 770 624 A1 discloses a method and an apparatus for producing a three-phase current to a three-phase output from a DC voltage input. The method comprises producing a positive current, a negative current, and an intermediate current by using switching converters. The produced positive current follows a path of a highest phase of a sinusoidal three-phase signal at a given time, the produced negative current follows a path of a lowest phase of the three-phase signal at the given time, and the produced intermediate current follows a path of a phase of the three-phase signal between the highest and the lowest phase at the given time. The produced currents are switched to each phase conductor of the three-phase output in sequence so that phase currents of the three-phase current are formed in the output conductors.

AIMS OF THE INVENTION

The present invention aims at providing a DC-to-AC power converter that presents a higher efficiency than those of prior art.

SUMMARY OF THE INVENTION

The DC-to-AC power converter according to the invention has a main DC input and a main single phase AC output, is able to convert and adapt a DC voltage at said main DC input into a sinusoidal AC voltage VoutAC of fundamental frequency $f_0$ at said main AC output, and is able to deliver a rated power at said main AC output. The DC-to-AC power converter comprises:
- a first DC-to-DC converter having as input said main DC input and having a first DC output;
- a bidirectional voltage-type DC-to-AC converter having a first DC input-output connected in parallel to the first DC output and a first AC output-input connected in parallel to the main AC output;
- a tank capacitor connected in parallel to said first DC output;

wherein said main DC input has a first terminal and a second terminal.

In some applications the sinusoidal AC output voltage may be replaced for example by a trapezoidal AC output voltage. DC-to-AC power converters with such outputs are also within the scope of the invention.

The DC-to-AC converter is characterised in that it further comprises:
- a current-type DC-to-AC converter having a first DC input and a first AC output, said first DC input being connected in parallel to said main DC input and said first AC output being connected in parallel to said main AC output; and
- control means for:
  - controlling said bidirectional voltage-type DC-to-AC converter for delivering at said first AC output-input a sinusoidal AC voltage of said fundamental frequency $f_0$;
  - controlling said current-type DC-to-AC converter for delivering at said first AC output a quasi square-type AC current of said fundamental frequency $f_0$ and in phase with said sinusoidal AC voltage;
  - imposing that at least 50% of said rated power is provided by said current-type DC-to-AC converter.

The expression "voltage-type" DC-to-AC converter means that this converter behaves as a voltage source. The expression "current-type" DC-to-AC converter means that this converter behaves as a current source. The expressions "voltage source" and "current source" are well-known by the one skilled in the art.

Control means are able to control the current-type DC-to-AC converter for delivering at its output (i.e. the first AC output) a quasi square-type current. As a consequence, the electric power delivered at said first AC output is less changing with respect to the power delivered at the output of the DC-to-AC converter "50" of FIG. 2. The control means are able to impose that at least 50%, preferably 50-70%, of the rated power (current) at the main AC output of the DC-to-AC power converter is provided by the current-type DC-to-AC converter. The rated power (current) is preferably defined as the RMS value of the electric power (current) when a passive load is connected to the main AC output. Converter "50" operates on the low side of the output voltage sine wave, while converter "70" operates on the high side thereof. Converters "50" and "70" are driven independently. As current-type DC-to-AC converter 70 is more direct in energy conversion than converters "30" and "50" which are in series, the efficiency of converter "70" increases when one is remote from the zero voltage (i.e. at high output voltage).

The tank capacitor connected to the first DC-to-AC input-output of the bidirectional voltage-type DC-to-AC converter is able to provide, via the first DC-to-DC converter that has as input the main DC input, the complementary electric power in order to obtain at the main AC output a sinusoidal voltage, and further a sinusoidal current if a passive load is connected to the main AC output. The electric current, and so the electric power, delivered by the bidirectional voltage-type DC-to-AC converter is much more changing. The control means are able to control the bidirectional voltage-type DC-to-AC converter for delivering at its first AC output-input a sinusoidal voltage. This first AC output-input is electrically connected in parallel to the main AC output. As a consequence, if a passive load is connected to the main AC output, a sinusoidal electric current flows through it. The electric current flowing at the first AC output-input of the bidirectional DC-to-AC converter can be found from the first Kirchoff law: such an electric current is obtained by taking the difference between the sinusoidal current at the main AC output and the quasi square-type current provided by the current-type DC-to-AC converter at the first AC output. It follows that the electric current flowing at the first AC output-input of the bidirectional voltage-type DC-to-AC converter undergoes relatively large changes. Hence, the efficiency of the bidirectional DC-to-AC converter is less than the efficiency of the first isolated DC-to-AC converter. However, as control means are able to impose that at least 50-70% of the rated current is provided by the current-type DC-to-AC converter, the gain in efficiency carried out by the current-type DC-to-AC converter is not cancelled by the loss in efficiency induced in the bidirectional voltage-type DC-to-AC converter. The total efficiency of the DC-to-AC power converter is thus increased.

Preferably, in the DC-to-AC power converter according to the invention, said sinusoidal AC voltage at said main AC output having a varying instantaneous value VoutAC(t) and a peak value VoutAC(max); said control means are also able to control said first DC-to-DC converter and said current-type DC-to-AC converter for charging the tank capacitor from the main DC input through the first DC-to-DC converter when |VoutAC(t)|<0.40*VoutAC(max). Note that |VoutAC(t)| is the absolute value of VoutAC(t).

It is desired to have an input electric power at the main DC input that is nearly constant. However, at the main AC output, the delivered electric power is not constant. In particular, when the sinusoidal AC voltage VoutAC at the main AC output is equal or close to zero, the delivered electric power is also equal or close to zero. In this preferred embodiment, the control means are also able to control the first DC-to-DC converter for maintaining an input electric power at said main DC input that is nearly constant. More precisely, the control means impose a charging of the tank capacitor from the main DC input, through the first DC-to-DC converter when the electric power delivered at the main AC output is close to zero.

In a preferred embodiment for the DC-to-AC power converter according to the invention:
said first DC-to-DC converter is an isolated converter and comprises:
a primary circuit having as input said main DC input, having a primary output, said primary output having a first primary terminal and a second primary terminal that is directly connected to said second terminal, comprising:
an input inductance and a primary capacitor connected in series between the first terminal and the first primary terminal;
input switching means for alternately connecting and disconnecting a junction between said input inductance and said primary capacitor to a junction between the second terminal and the second primary terminal;
a first secondary circuit having a first secondary input and as output said first DC output;
said current-type DC-to-AC converter is an isolated converter and comprises:
same primary circuit;
a second secondary circuit for providing at said first AC output a positive alternation of said quasi square-type AC current, having a second secondary input and a second secondary output, said second secondary output being connected in parallel to said first AC output;
a third secondary circuit for providing at said first AC output a negative alternation of said quasi square-type AC current, having a third secondary input and a third secondary output, said third secondary output being connected in parallel to said first AC output (85); and
said DC-to-AC power converter further comprises an isolated transformer for magnetically linking said primary output to said first, second and third secondary inputs respectively.

In this preferred embodiment, the first DC-to-DC converter and the current-type DC-to-AC converter are isolated. Hence, there is a galvanic isolation between the main DC input and the main AC output allowing to isolate and so to protect a battery connected to the main DC input from possible disturbances at the main AC output. Moreover, this preferred embodiment is also characterised in that the first DC-to-DC converter and the current-type DC-to-AC converter have a same primary circuit, and in that said primary circuit has only one switching means. Such an implementation allows obtaining a compact DC-to-AC power converter that uses few components and that is thus cheaper.

In the DC-to-AC power converter according to another preferred embodiment, wherein said first AC output has a third terminal and a fourth terminal and said second secondary input has a fifth and a sixth terminal that is directly connected to said fourth terminal, said third secondary input has same sixth terminal and a eighth terminal;

said second secondary circuit comprises:
a first secondary capacitor and a first secondary inductance wherein said first secondary capacitor is connected in series between said fifth terminal and said first secondary inductance, said first secondary inductance being connected with said third terminal;
first secondary switching means for alternatively disconnecting and connecting through a first secondary diode a junction between said first secondary capacitor and said first secondary inductance to a junction between said fourth terminal and said sixth terminal;

said third secondary circuit comprises:
a second secondary capacitor and a second secondary inductance wherein said second secondary capacitor is connected in series between said eighth terminal and said second secondary inductance, said second secondary inductance being connected with said third terminal;
second secondary switching means for alternatively disconnecting and connecting through a second secondary diode a junction between said second secondary capacitor and said second secondary inductance to a junction between said fourth terminal and said sixth terminal.

In other words, this preferred embodiment corresponds to a configuration where the current-type DC-to-AC converter comprises two isolated CUK converters having a same primary circuit. CUK converters are known by the one skilled in the art. Such converters allow reducing current ripple as it is known by the one skilled in the art (see for instance the book entitled "Fundamentals of Power Electronics" by Robert W. Erickson and Dragan Maksimovic, Kluwer Academic Publishers). This embodiment has the advantage of using two diodes (first and second secondary diodes) and switching means (first and second secondary switching means) that are connected in parallel to the second secondary input and to the third secondary input respectively. Hence, the losses induced by these diodes and these switching means are reduced with respect to an implementation where the diodes (and/or the switching means) would be connected in series between the fifth (or eight) terminal and the third terminal for instance.

When a first (for instance positive) polarity of the quasi square-type current is desired at the first AC output, the control means control the first and the second secondary switching means so that the second secondary circuit provides said first polarity for instance. During this time interval, the third secondary circuit only weakly contributes to the electric current at the first AC output. Nevertheless, its small contribution allows further reducing current ripple at said first AC output.

In another preferred embodiment of the DC-to-AC power converter:
said first AC output has a third terminal and a fourth terminal,
said second secondary input has a fifth terminal and a sixth terminal;
said third secondary input has same sixth terminal and a eighth terminal;
said second secondary circuit comprises:
a secondary capacitor that is connected in series between said sixth terminal and fourth terminal,
a first secondary inductance that is connected in series between said fifth terminal and said third terminal;
first secondary switching means for alternatively disconnecting and connecting through a first secondary diode said fifth terminal to a junction between said secondary capacitor and said fourth terminal;

said third secondary circuit comprises:
same secondary capacitor that is connected in series between said sixth terminal and fourth terminal;
a second secondary impedance that is connected in series between said eighth terminal and said third terminal;
second secondary switching means for alternatively disconnecting and connecting through a second secondary diode said eighth terminal to a junction between said secondary capacitor and said fourth terminal.

In this preferred embodiment, the current-type DC-to-AC converter also comprises two isolated CUK converters having a same primary circuit. However, the second and third secondary circuits share a same secondary capacitor here, reducing the number of elements of the DC-to-AC power converter, and thus its cost and weight respectively. The primary and secondary capacitors allow a capacitive energy transfer from main DC input to second or third secondary output.

According to another preferred embodiment of the DC-to-AC power converter according to the invention, wherein:
said first secondary input has a ninth terminal and a tenth terminal,
said first DC output has an eleventh terminal and a twelfth terminal; said isolated transformer has:
a primary winding;
a first, a second, and a third secondary windings, of turn ratios with respect to said primary winding 1:T, 1:N, and 1:N respectively;
said primary winding is connected to said primary output;
said first secondary winding is connected to said first secondary input;
said second secondary winding is connected to said second secondary input;
said third secondary winding is connected to said third secondary input;
said first secondary circuit comprises a diode that is connected in series between said ninth terminal and eleventh terminal,
said tenth terminal is connected to said twelfth terminal; and $$T \leq N \frac{VDC}{V_{outAC(\max)}},$$

wherein VDC is a constant voltage value across said tank capacitor.

Preferably in a still preferred embodiment, $$T = N \frac{VDC}{V_{outAC(\max)}},$$

In this preferred embodiment, charging of the tank capacitor connected in parallel to said DC output (capacitor "40") is carried out by an isolated SEPIC circuit. The SEPIC topology is known by the one skilled in the art. Such a configuration has the advantage of not requiring an inductance in the first secondary circuit. The presence of the diode does not induce a large voltage drop, allowing providing a large voltage across the capacitor. By choosing $$T \le N \frac{VDC}{VoutAC(\max)},$$

only the first and second secondary switching means are necessary to control the power transfer to the main AC output or to the capacitor. Preferably, selecting $$T = N \frac{VDC}{VoutAC(\max)}$$

allows reducing the weight of the transformer. Another advantage of this embodiment is that, at any time, there is only one diode that conducts an electric current.

SHORT DESCRIPTION OF THE DRAWINGS

These and further aspects of the invention will be explained in greater detail by way of example and with reference to the accompanying figures.

FIG. 1 illustrates a typical configuration of a DC-to-AC power converter according to prior art.

FIG. 2 schematically shows a DC-to-AC power converter of the invention according to a first embodiment.

FIG. 3 schematically shows a DC-to-AC power converter of the invention according to a preferred embodiment.

FIG. 4 schematically shows a DC-to-AC power converter of the invention according to another preferred embodiment.

FIG. 5 schematically shows a DC-to-AC power converter of the invention according to still another preferred embodiment.

FIG. 6 schematically shows a DC-to-AC power converter of the invention according to still another preferred embodiment.

The figures are not drawn to scale. Generally and when possible, identical components are denoted by the same reference numerals in the figures.

DETAILED DESCRIPTION OF PREFERRED EMBODIMENTS OF THE INVENTION

Figure 1:
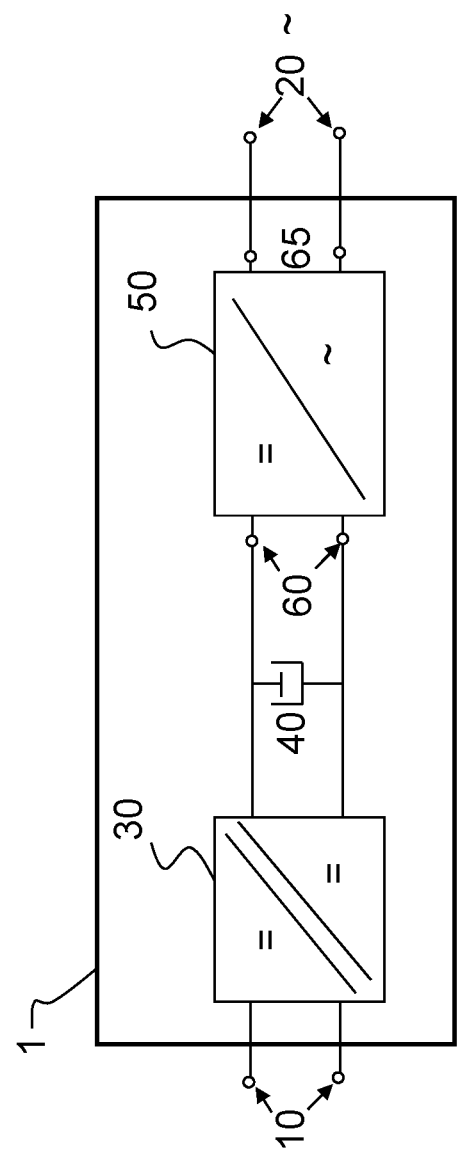
Figure 2:
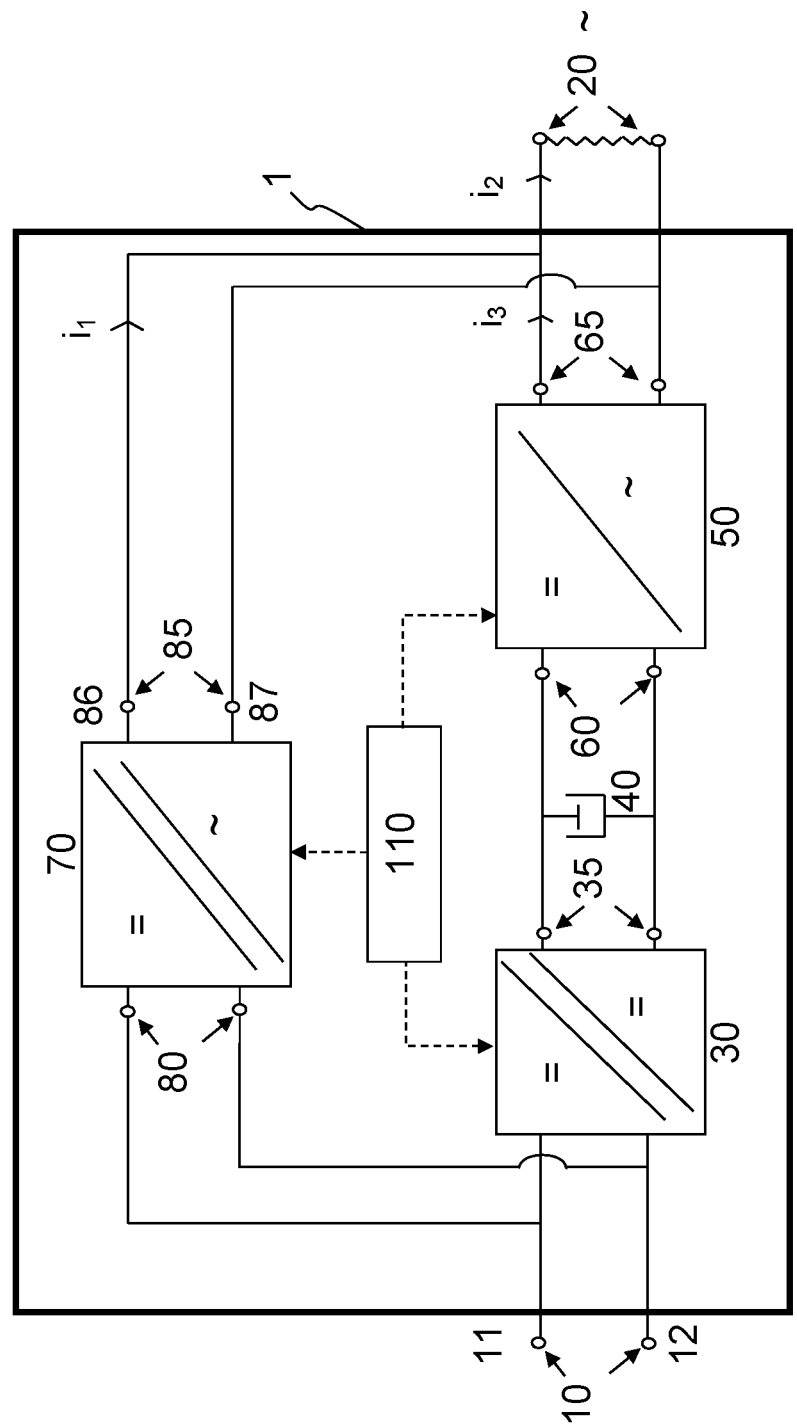

FIG. 2 schematically shows a DC-to-AC power converter 1 of the invention according to a first embodiment. The DC-to-AC power converter 1 has a main DC input 10 and a main AC output 20. It is able to convert and adapt, e.g. amplify, a DC voltage at said main DC input 10 into a substantially sinusoidal AC voltage VoutAC of fundamental frequency $f_0$ at said main AC output 20, and is able to deliver a rated current at said main AC output 20. The rated current is defined as the RMS value of the electric current flowing through a load when such a load is connected to the main AC output 20. The term RMS value is known by the one skilled in the art. For illustrative purposes, a resistor is connected at the main AC output 20 in FIG. 2. The main DC input (10) has a first terminal 11 and a second terminal 12.

The DC-to-AC converter 1 of the invention comprises a first DC-to-DC converter 30 having as input said main DC input 10 and having a first DC output 35. This first DC-to-DC converter 30 is preferably isolated to protect a battery connected at said main DC input 10. Preferably, this first DC-to-DC converter 30 allows amplifying an electric voltage at said main DC input 10. A tank capacitor 40 is electrically connected in parallel to and in between the first DC output 35 and a first DC input-output 60 of a bidirectional voltage-type DC-to-AC converter 50. Said bidirectional voltage-type DC-to-AC converter 50 has a first AC output-input 65 that is electrically connected in parallel to the main AC output 20. The tank capacitor 40 notably allows storage of electric energy because of a possible phase shift between the first DC-to-DC converter 30 and the bidirectional voltage-type DC-to-AC converter 50. As this last converter 50 is bidirectional, electric energy can flow from the first DC input-output 60 to the first AC output-input 65 and inversely.

As shown in FIG. 2, the DC-to-AC power converter 1 of the invention further comprises a current-type DC-to-AC converter 70 having a first DC input 80 and a first AC output 85. The first DC input 80 is electrically connected in parallel to the main DC input 10 and the first AC output 85 is electrically connected in parallel to the main AC output 20. The first AC output 85 has a third 86 and a fourth 87 terminal.

At last, the DC-to-AC power converter 1 of the invention comprises control means 110 for:
controlling said bidirectional voltage-type DC-to-AC converter 50 for delivering a substantially sinusoidal AC voltage of said frequency $f_0$ at said first AC output-input 65;
controlling said current-type DC-to-AC converter 70 for delivering a substantially quasi square-type current of said frequency $f_0$ at said first AC output 85 and being substantially in phase with said substantially sinusoidal AC voltage, in order to extract substantially instantaneous constant power;
imposing that at least 50-70% of the rated power (current) provided by the whole DC-to-AC power converter 1 is provided by said current-type DC-to-AC converter 70.

Different types of bidirectional voltage-type DC-to-AC converters 50 may be used for generating the sinusoidal AC voltage of said frequency $f_0$ at the first AC output-input 65. Typically, such converters comprise switches that can be controlled by PWM signals in order to deliver at the AC output of such converters (i.e. first AC output-input 65 in the case of FIG. 2) a substantially sinusoidal AC voltage. Such techniques are well-known by the one skilled in the art. Control means 110 can be for instance a microcontroller.

The current-type DC-to-AC converter 70 is controlled in order to deliver at the first AC output 85 a substantially quasi square-type current of said frequency $f_0$ and being substantially in phase with the substantially sinusoidal AC voltage at the first AC output-input 65 of the converter 50. Some examples of such a current-type DC-to-AC converter 70 are presented below in preferred embodiments. Typically such a current-type DC-to-AC converter 70 comprises switching means that can be controlled by PWM signals in order to deliver at the first AC output 85 a substantially quasi square-type signal (voltage or current). Such techniques are well-known by the one skilled in the art.

Converters (namely 30, 50, 70 for instance) comprise different electronic components. Control means 110 impose that the current-type DC-to-AC converter 70 delivers a substantially quasi square-type current at the first AC output 85. Converter 50 operates on the whole voltage sine wave extent, while converter 70 operates only on the high side thereof. Converters 50 and 70 are driven independently. As current-type DC-to-AC converter 70 is more direct in energy conversion than converters 30 and 50 in series, the efficiency of converter 70 increases when one is remote from the zero voltage (i.e. at high output voltage).

The control means 110 are able to control the bidirectional voltage-type DC-to-AC converter 50 for delivering at its first AC output-input 65 a substantially sinusoidal voltage. This first AC output-input 65 is electrically connected in parallel to the main AC output 20. As a consequence, if a passive load (for instance a resistor as shown in FIG. 2) is connected to the main AC output 20, a substantially sinusoidal electric current flows through it. The electric current flowing at the first AC output-input of the bidirectional DC-to-AC converter 65 and that we name $i_3$ can be found from the first Kirchhoff law: such an electric current, $i_3$, is obtained by taking the difference between the current $i_2$ flowing through the load (resistor in FIG. 2) and the substantially quasi square-type current provided by the current-type DC-to-AC converter 70 at the first AC output 85 ($i_1$), i.e. $i_2 = i_1 + i_3$.

As a consequence, the electric power at the first AC output-input 65 is much more changing. In order to have an increase of the global efficiency of the DC-to-AC power converter 1, the inventors have found that the control means 110 should impose that at least 50%, preferably 65%, and more preferably 70%, of the rated power at the main AC output 20 is provided by the current-type DC-to-AC converter. This optimum of at least 70% for the rated power at the main AC output provided by the current-type DC-to-AC converter has been obtained according loss models (e.g. macromodel) applied to the components of the circuit (e.g. Joule losses, switch losses, . . . ) when the power route is shared between both converters.

Figure 7:
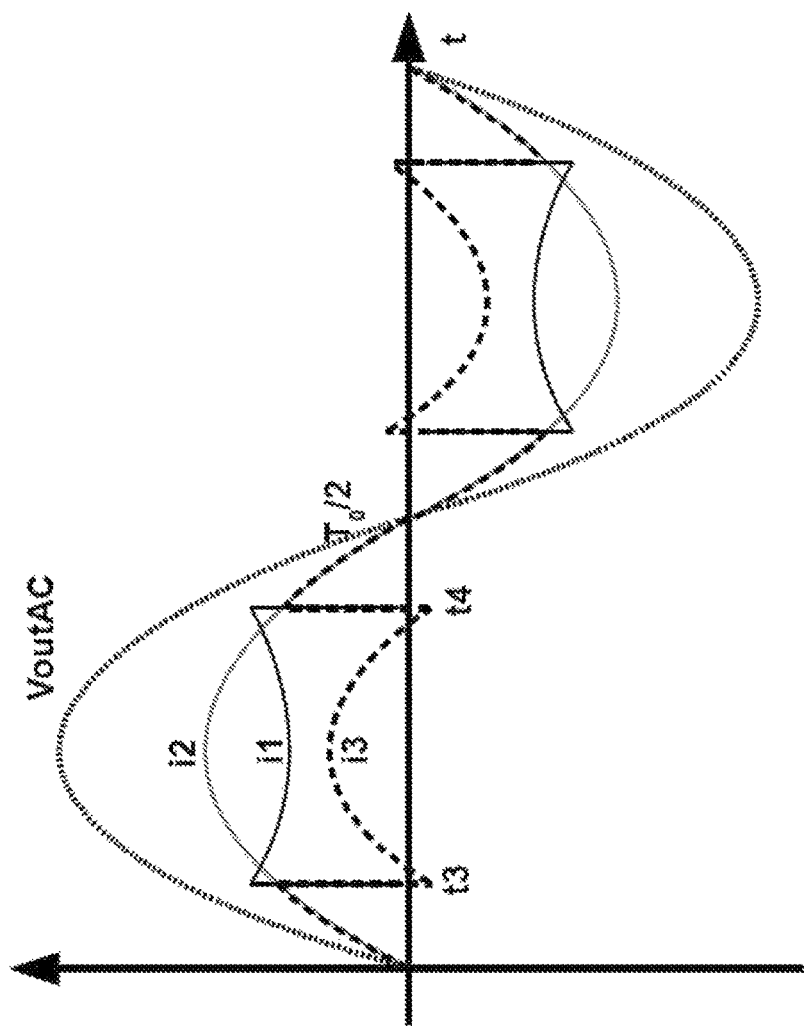
FIG. 7 shows the time variation of three significant electric currents.

FIG. 7 shows an illustrative example of the time variation of currents $i_1$, $i_2$, and $i_3$ of FIG. 2 during a period $T_0 = 1/f_0$. Time and current units on the vertical and horizontal axes are arbitrary in this illustrative example. During the time interval [0; $t_3$], all the electric power delivered to the load connected at the main AC output 20 is provided by the voltage-type DC-to-AC converter 50 and the current-type DC-to-AC converter 70 is not operating. Converters 50 and 70 are not operating at the same time between 0 and $t_3$ and between $t_4$ and $T_0/2$, for the positive half wave of the voltage. So converter 50 provides all the current at the main AC output ($i_2 = i_3$). Hence, $i_3$ (with the sign convention of FIG. 2) is positive in the time interval [0; $t_3$]. At time $t_3$, current-type DC-to-AC converter 70 is switched on and as current $i_1$ undergoes sharp transition and gets greater than current $i_2$, the excess of electric power delivered by the current-type DC-to-AC converter 70 is sent to the tank capacitor 40 through the bidirectional voltage-type DC-to-AC converter 50. Current $i_3$ thus becomes negative allowing the transfer of some electric power to the tank capacitor 40. In the time interval [$t_3$; $t_4$], the "power" equal to the voltage at the first AC output-input 65 (VoutAC) times $i_1$ is constant, thus $i_1$ is not a flat value over this time range.

Between $t_3$ and $t_4$, $i_3$ increases and changes its sign (becoming positive) and at this crossover the tank capacitor 40 is stopped to be loaded and electric power is transferred from the tank capacitor 40 to a load connected at the main AC output 20. At time $t_4$, converter 70 is switched off, current $i_1$ sharply falls to zero and current $i_3$ becomes positive according to a sharp transition. Again in the vicinity of the transition at $t_4$, i1 is greater than i2 and the excess of electric power delivered by the current-type DC-to-AC converter 70 is sent to the tank capacitor 40 through the bidirectional voltage-type DC-to-AC converter 50.

Between $t_4$ and $T_0/2$, electric current $i_3$ is positive and is followed by $i_2$. $T_3$ is preferably equal to $T_0/10$, more preferably equal to $T_0/20$, and still more preferably equal to $T_0/30$ or less.

Figure 8:
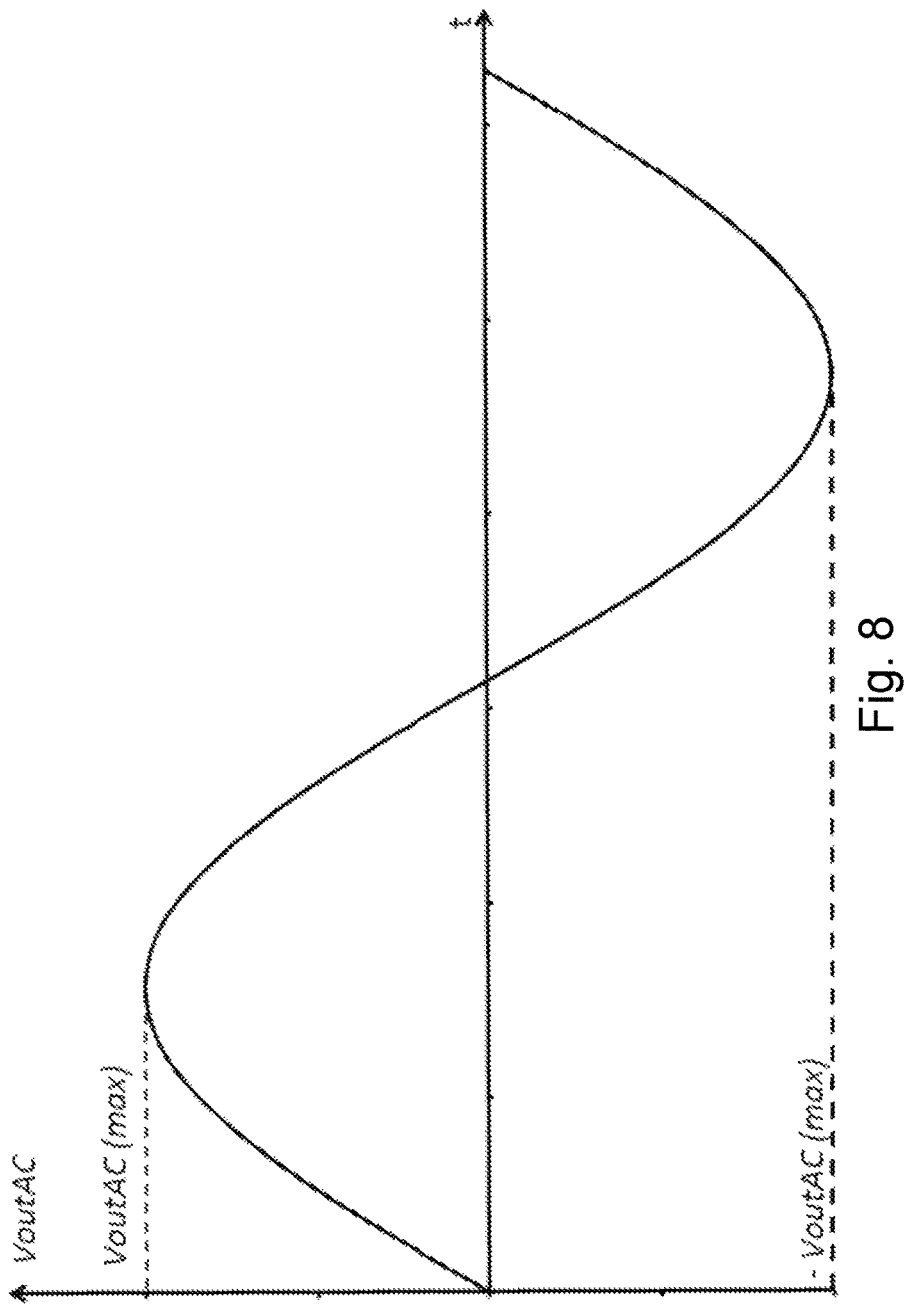
FIG. 8 shows the time variation of the substantially sinusoidal AC voltage VoutAC of fundamental frequency $f_0$ at the main AC output.

The DC-to-AC power converter 1 of the invention is able to deliver at its main AC output 20 a substantially sinusoidal AC voltage VoutAC of fundamental frequency $f_0$. FIG. 8 shows an example of time variation of such a substantially sinusoidal AC voltage VoutAC (in arbitrary units) that has a peak value VoutAC(max). By convention, the peak value is chosen to be always positive.

Preferably, the control means 110 are also able to control the first DC-to-DC converter 30 and the current-type DC-to-AC converter 70 for charging the tank capacitor 40 from the main DC input 10 through the first DC-to-DC converter 30 when the instantaneous value of VoutAC has an absolute value that is lower than 50%, more preferably lower than 40%, of the peak value VoutAC(max). Then, the flow of electric power from the main DC input 10 through the current-type DC-to-AC converter 70 is typically stopped when VoutAC has an absolute value that is lower than 50%, more preferably lower than 40%.

Figure 3:
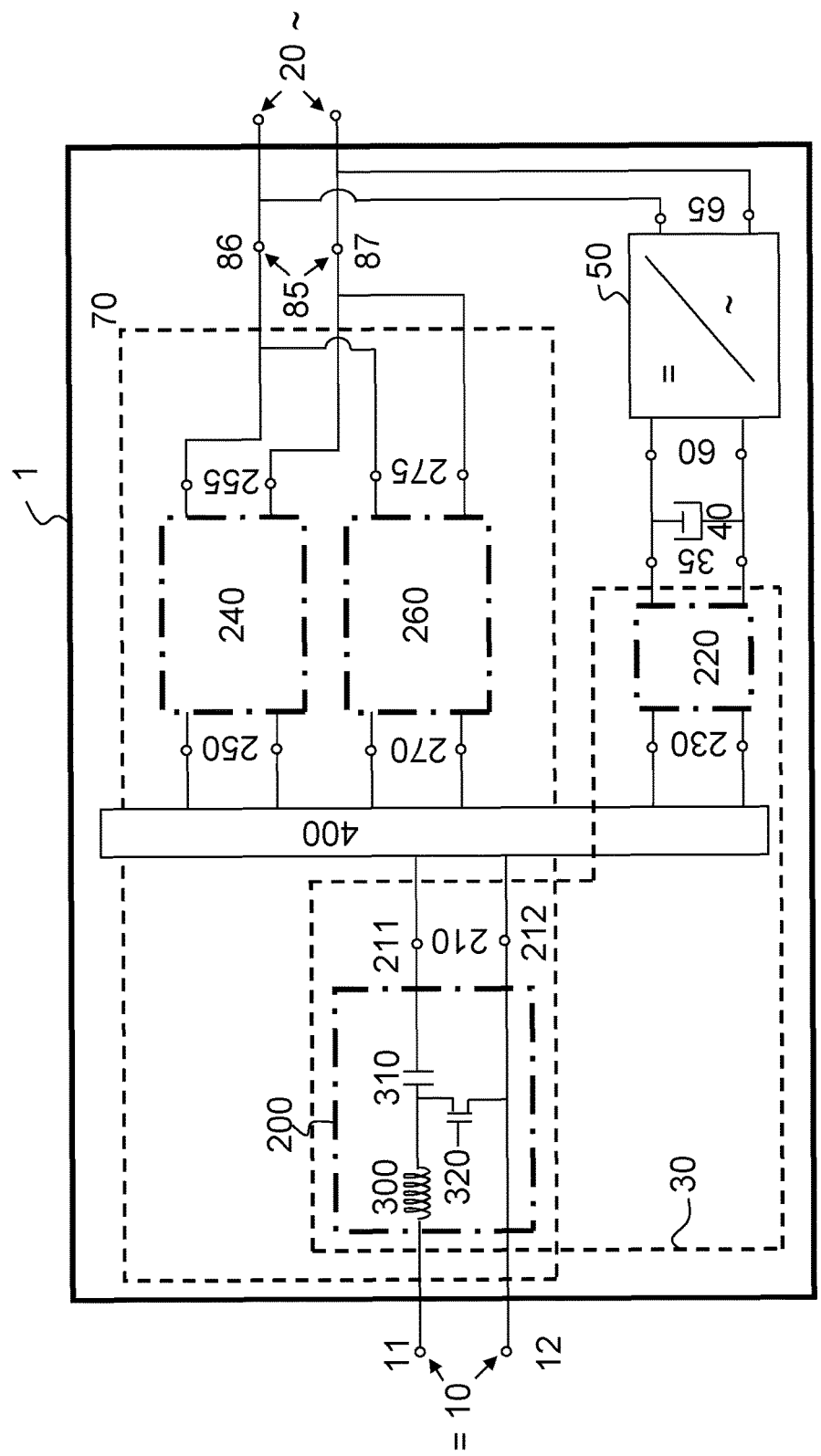

FIG. 3 shows a preferred embodiment of the DC-to-AC power converter 1 of the invention. In this preferred embodiment, the first DC-to-DC converter 30 is isolated; it comprises a primary circuit 200 and a first secondary circuit 220. The primary circuit 200 has as input the main DC input 10 and has a primary output 210. This primary output 210 has a first primary terminal 211 and a second primary terminal 212. The second primary terminal 212 is directly electrically connected to the second terminal 12. The primary circuit 200 comprises an input inductance 300 connected in series with the first terminal 11 of the main DC input 10. The primary circuit 200 also comprises a primary capacitor 310 connected in series between the input inductance 300 and the first primary terminal 211. Input switching means 320 allows alternately connecting and disconnecting a junction between the input inductance 300 and the primary capacitor 310 to the second terminal 12 of the main DC input 10. As shown in FIG. 3, the first secondary circuit 220 has a first secondary input 230 and as output the first DC output 35. The first secondary input 230 has a ninth terminal 231 and a tenth terminal 232, and the first DC output 35 has an eleventh 236 and a twelfth 237 terminal (these last reference signs are not shown in FIG. 3, but in FIG. 6).

In the preferred embodiment of FIG. 3, the current-type DC-to-AC converter 70 is also isolated. It comprises the same primary circuit 200 as the one of the first DC-to-DC converter 30. It further comprises a second 240 and a third 260 secondary circuit. One can define a first and a second polarity of the substantially quasi square-type current provided by the current-type DC-to-AC converter 70. As an example, the electric current $i_1$ of FIG. 7 has a first positive polarity in the time interval [0; $T_0/2$], and a second negative polarity in the time interval [$T_0/2$; $T_0$]. The second (respectively third) secondary circuit 240 (respectively 260) is able to provide at the first AC output 85 a part of the substantially quasi square-type current that has the first (respectively second) polarity. Examples of such secondary circuit are shown below. By using the primary circuit 200 described above, one can choose different second 240 and third 260 secondary circuits. An isolated transformer 400 is used for magnetically linking the primary output 210 of the primary circuit 200 to the first 230, second 250 and third 270 secondary inputs. The second (resp. third) secondary circuit has the second (resp. third) secondary input 250 (resp. 270).

Figure 4:
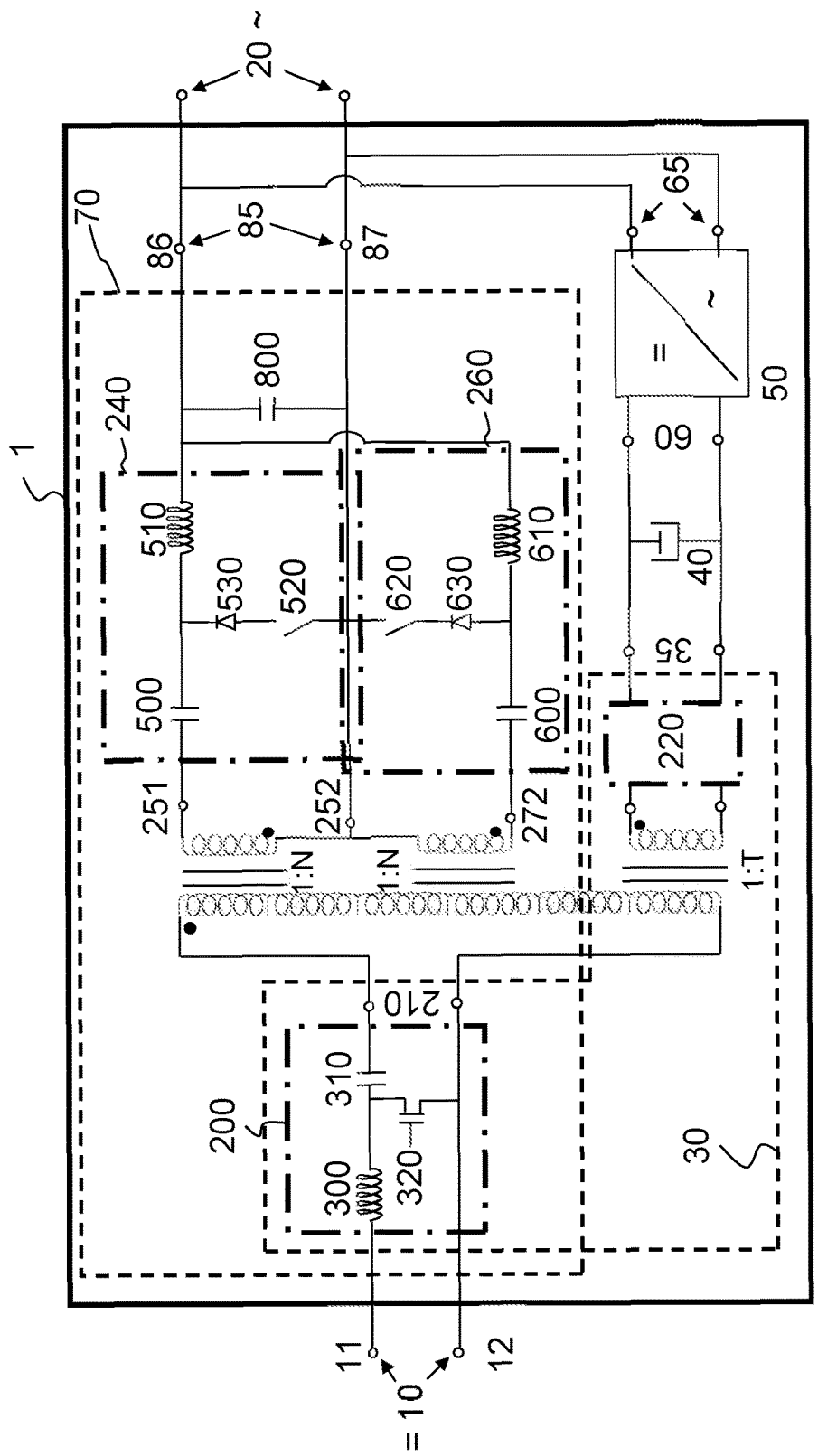

FIG. 4 shows another preferred embodiment of the invention. In this preferred embodiment, the inventors propose to use two isolated CUK converters for generating the substantially square-type current at the first AC output 85 of the current-type DC-to-AC converter 70. As shown in FIG. 4, the second secondary circuit 240 comprises a first secondary capacitor 500 and a first secondary inductance 510 wherein the first secondary capacitor 500 is connected in series between a fifth terminal 251 of the second secondary input 250 and the first secondary inductance 510. This first secondary inductance 510 is directly electrically connected to a third terminal 86 of the first AC output 85. First secondary switching means 520 is able to alternatively disconnect and connect through a first secondary diode 530 a junction between the first secondary capacitor 500 and the first secondary inductance 510 to a fourth terminal 87 of the first AC output 85. This fourth terminal 87 is electrically connected to a sixth 252 terminal of the second secondary input 250. The third secondary circuit 260 comprises a second secondary capacitor 600 and a second secondary inductance 610. The second secondary capacitor 600 is connected in series between an eighth terminal 272 of the third secondary input 270 and the second secondary inductance 610 that is directly electrically connected to the third terminal 86. Second secondary switching means 620 is able to alternatively disconnect and connect through a second secondary diode 630 a junction between the second secondary capacitor 600 and the second secondary inductance 610 to the fourth terminal 87.

When a first (for instance positive) polarity of the quasi square-type current is desired at the first AC output 85, the control means 110 (not shown in FIG. 4) control the first 520 and the second 620 secondary switching means so that the second secondary circuit 240 provides said first polarity for instance. More precisely, the first secondary switching means 520 is then ON (i.e. closed) and the second secondary switching means 620 is then OFF (i.e. open). During this time interval, the third secondary circuit 260 then only weakly contributes to the electric current at the first AC output 85. When both first 520 and second 620 secondary switching means are OFF, power can however be delivered to the tank capacitor 40 through the first secondary circuit 220 driven by the primary circuit 200. Preferably one can use another CUK configuration for this first secondary circuit 220; that means: a capacitor, an inductance and switching means connected as in the case of the second and third secondary circuits. Another possibility for the first secondary circuit 220 is detailed below in another preferred embodiment. As shown in FIG. 4, a filtering capacitor 800 is preferably connected in parallel to the first AC output 85 for filtering purposes.

Figure 5:
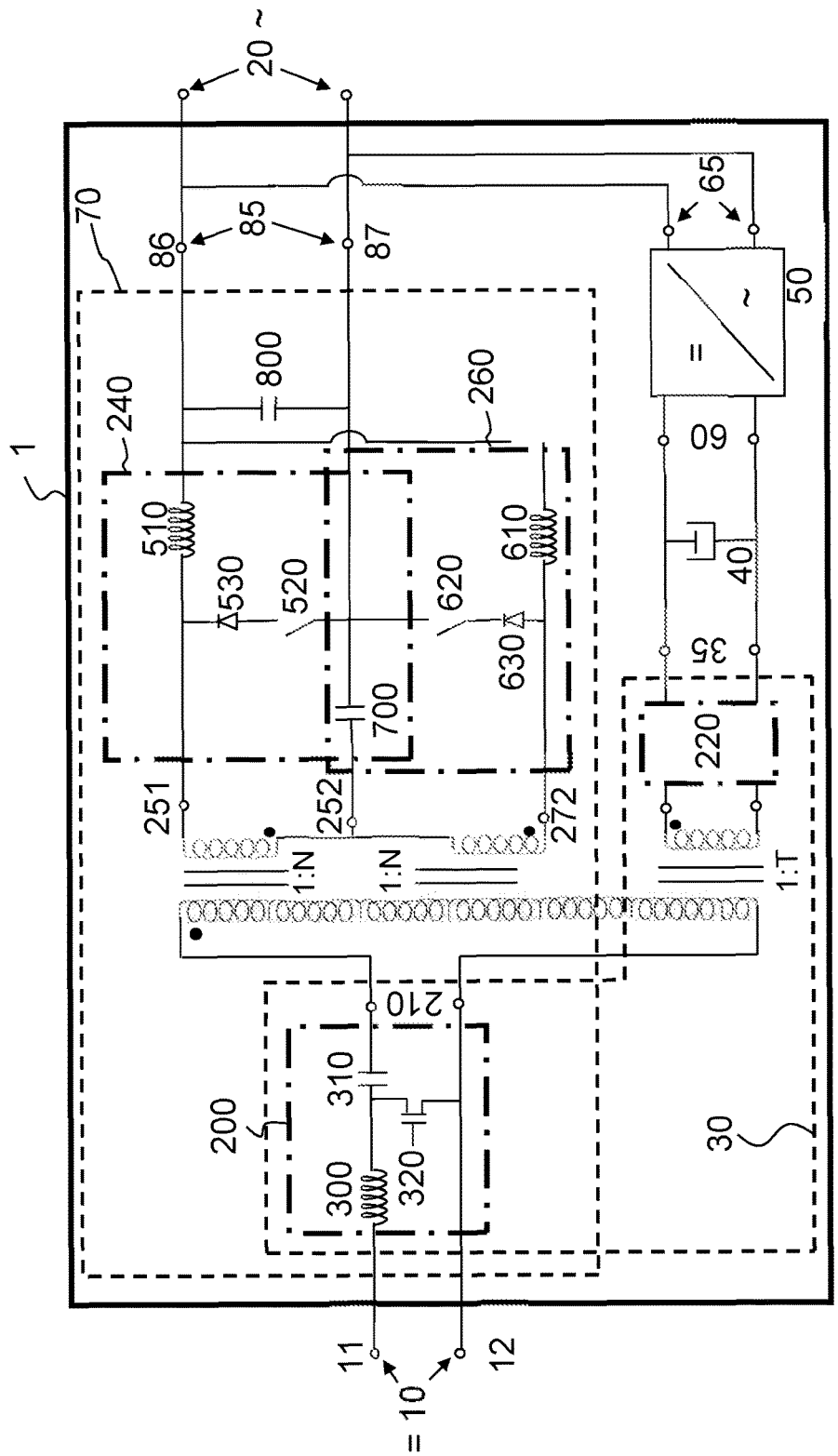

FIG. 5 shows another preferred embodiment of the invention that is close to the one shown in FIG. 4. In this preferred embodiment a common secondary capacitor 700 is used for the second 240 and third 260 secondary circuit.

Figure 6:
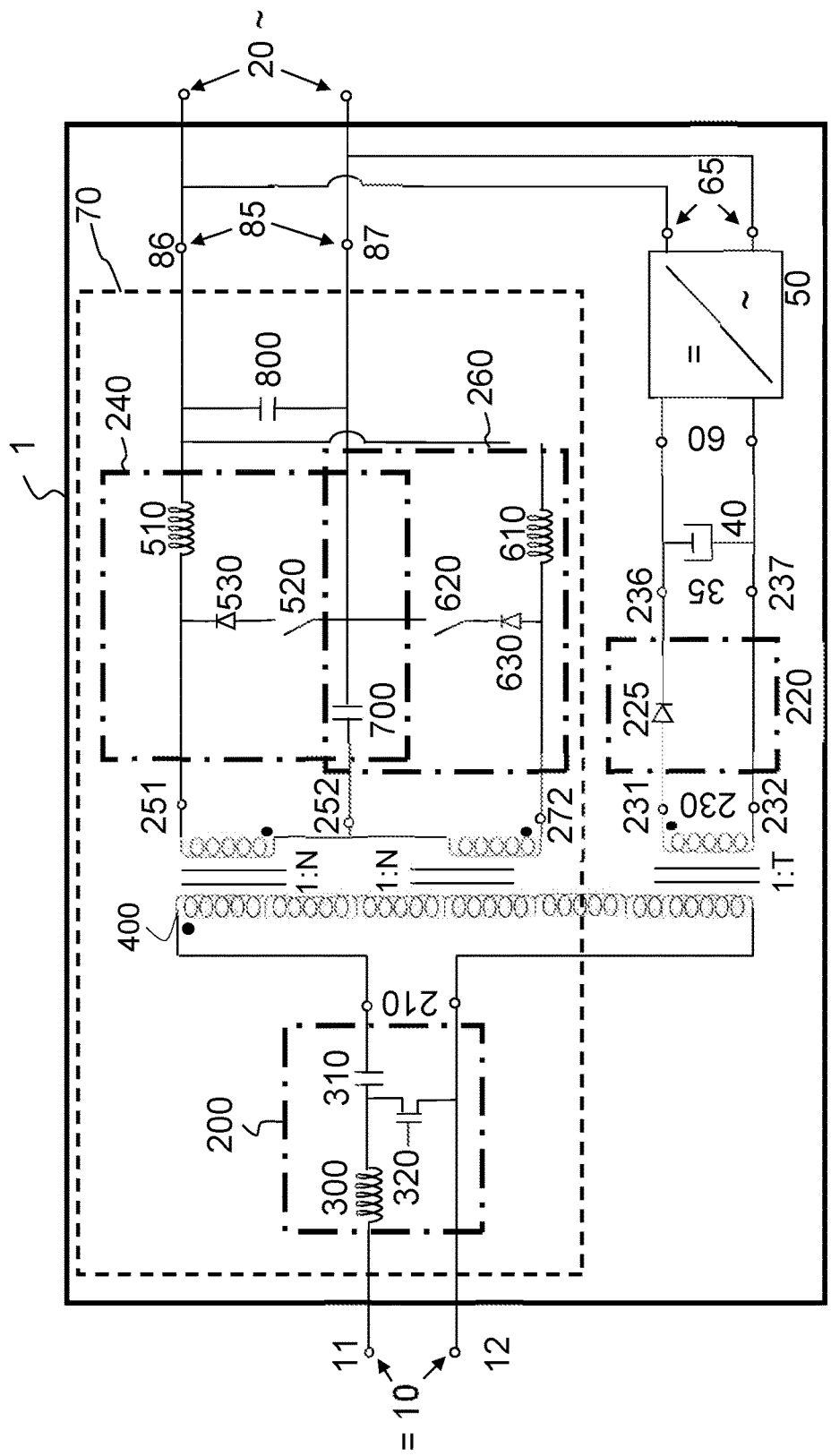

FIG. 6 shows another preferred embodiment of the DC-to-AC power converter 1 of the invention. In this preferred embodiment, the first secondary circuit 220 comprises a diode 225 that is electrically connected in series between a ninth terminal 231 of the first secondary input 230 and an eleventh terminal 236 of the first DC output 35. A tenth terminal 232 of the first secondary input 230 is directly electrically connected to a twelfth terminal 237 of the first DC output 35. Hence, in this preferred embodiment, the first DC-to-DC converter 30 is an isolated SEPIC converter that comprises a primary circuit 200 that is also used for the second 240 and third 260 secondary circuits.

In the embodiment of FIG. 6, the isolated transformer 400 comprises: a primary winding that is electrically connected to the primary output 210; a first secondary winding that is electrically connected to the first secondary input 230; a second secondary winding that is electrically connected to the second secondary input 250; and a third secondary winding that is electrically connected to the third secondary input 270. In a preferred version, the turn ratios of the first, second, and third secondary windings with respect to the primary winding are assumed to be 1:T, 1:N, and 1:N respectively. Preferably, N=8, and T=10.

The inventors have found that the power transfer to the first AC output 85 or to the first DC output 35 can then be controlled by using only the first 520 and second 620 secondary switching means of the preferred embodiment of FIG. 6 if the turn ratios of the windings of the isolated transformer 400 are chosen as follows:

$$T \le N \frac{VDC}{VoutAC(\max)} \quad \text{(Eq. 1)}$$

where VDC is a substantially constant voltage value across the tank capacitor 40, while VoutAC(max) is the peak value of the substantially sinusoidal AC voltage VoutAC.

In the preferred embodiment of FIG. 6, VDC is given by the following equations:

$$VDC = T \frac{D}{1-D} V_{in}, \quad \text{(Eq. 2)}$$

where $V_{in}$ is the DC voltage at the main DC input 10. Preferably, $V_{in}$=50 V, VoutAC(max)=325 V, VDC=400 V. In equation (Eq. 2), D stands for the value of the duty cycle of the switching means 320 that is typically controlled by PWM. "Duty cycle" is a term known by the one skilled in the art: it represents the time percentage during which the switching means 320 is ON. Preferably, D is equal to 0.45, and more preferably is equal to 0.55.

In the preferred embodiment of FIG. 6, when the first 520 or the second 620 secondary switching means is ON (closed), an electric current having the first or the second polarity respectively is delivered to the first AC output 85. The first 520 and the second 620 secondary switches can be controlled so that power is directly delivered to the output without passing through converter 50. When first 520 or second 620 secondary switch is conducting, diode 225 is blocked and diode 530, diode 630 respectively, switches (in flyback mode). If the condition of (Eq. 1) is satisfied, only a weak quantity of electric power is then delivered to the tank capacitor 40. When both the first 520 and the second 620 secondary switching means are OFF (open), electric power is delivered to the tank capacitor 40. Diode 225 switches at the frequency set by transistor 320 but in complementary manner, in flyback mode (when transistor 320 is conducting, diode 225 is blocked and vice versa).

As shown in FIG. 6, a filtering capacitor 800 is preferably connected in parallel to the first AC output 85 for filtering purposes. The circuit of FIG. 6 has the advantage to provide smooth input and output currents, which makes filtering easier and reduces noise of the converter. However, in an alternate embodiment (not shown), one can remove inductances 510 and 610, while losing smoothing effect, and extract output power directly at capacitor 700.

In the embodiments described above, switching means can be for instance MOSFETs or BJTs. Preferably, the input inductance 300 has a value comprised between 10 and 100 µH, and is more preferably equal to 60 µH. Preferably, the primary capacitor 310 has a value comprised between 10 and 100 µF; this value is more preferably equal to 60 µF. Preferably, the secondary capacitor 700 has a value comprised between 0.1 and 50 µF; this value is more preferably equal to 3 µF. Preferably, the tank capacitor 40 has a value comprised between 500 and 2000 µF; this value is more preferably equal to 1000 µF. Preferably, the first 510 and second 610 secondary inductances have a value comprised between 100 and 2000 µH; this value is more preferably equal to 500 µH.

The present invention has been described in terms of specific embodiments, which are illustrative of the invention and not to be construed as limiting. More generally, it will be appreciated by persons skilled in the art that the present invention is not limited by what has been particularly or explicitly shown and/or described hereinabove.

The invention claimed is:

1. A DC-to-AC power converter having a main DC input and a main single phase AC output, able to convert and adapt a DC voltage at said main DC input into a sinusoidal AC voltage VoutAC of fundamental frequency $f_0$ at said main AC output, and able to deliver a rated power at said main AC output, comprising:
   a first DC-to-DC converter having as input said main DC input and having a first DC output, said main DC input having a first terminal and a second terminal;
   a bidirectional voltage-type DC-to-AC converter having a first DC input/output connected in parallel to the first DC output and a first AC output/input connected in parallel to the main AC output;
   a tank capacitor connected in parallel to said first DC output; and
   a current-type DC-to-AC converter having a first DC input and a first AC output, said first DC input being connected in parallel to said main DC input and said first AC output being connected in parallel to said main AC output;
wherein said DC-to-AC power converter further comprises a controller for:
   controlling said bidirectional voltage-type DC-to-AC converter for delivering at said first AC output/input a sinusoidal AC voltage of said fundamental frequency $f_0$;
   controlling said current-type DC-to-AC converter for delivering at said first AC output a quasi square-type AC current of said fundamental frequency $f_0$ and in phase with said sinusoidal AC voltage; and
   imposing that at least 50% of said rated power is provided by said current-type DC-to-AC converter,
   and wherein, over a half period $T_0$ of the sinusoidal AC voltage VoutAC, all the electric power delivered at the main AC output is respectively delivered by the voltage-type DC-to-AC converter in a first time interval and in a third time interval, and by the voltage-type DC-to-AC converter and the current-type DC-to-AC converter, both converters operating simultaneously, in a second time interval, said second time interval including a peak instant time of the sinusoidal AC voltage VoutAC.

2. The DC-to-AC power converter according to claim 1, wherein said sinusoidal AC voltage at said main single phase AC output has a varying instantaneous value VoutAC(t) and a peak value VoutAC(max);
   wherein said controller is also able to control said first DC-to-DC converter and said current-type DC-to-AC converter for charging the tank capacitor from the main DC input through the first DC-to-DC converter when |VoutAC(t)|<0.40 VoutAC(max).

3. The DC-to-AC power converter according to claim 1, wherein
   said first DC-to-DC converter is an isolated converter and comprises:
   a primary circuit having as input said main DC input, having a primary output, said primary output having a first primary terminal and a second primary terminal that is directly connected to said second terminal, comprising:
      an input inductance and a primary capacitor and connected in series between the first terminal and the first primary terminal; and
      an input switching means for alternately connecting and disconnecting a junction between said input inductance and said primary capacitor to a junction between the second terminal and the second primary terminal; and
   a first secondary circuit having a first secondary input and as output said first DC output; wherein
   said current-type DC-to-AC converter is an isolated converter and comprises:
   said primary circuit;
   a second secondary circuit for providing at said first AC output a positive alternation of said quasi square-type AC current, having a second secondary input and a second secondary output, said second secondary output being connected in parallel to said first AC output, and
   a third secondary circuit for providing at said first AC output a negative alternation of said quasi square-type AC current, having a third secondary input and a third secondary output, said third secondary output being connected in parallel to said first AC output; and wherein
   said DC-to-AC power converter further comprises an isolated transformer for magnetically linking said primary output to said first, second and third secondary inputs respectively.

4. The DC-to-AC power converter according to claim 3, wherein
   said first AC output has a third terminal and a fourth terminal,
   said second secondary input has a fifth terminal and a sixth terminal that is directly connected to said fourth terminal;
   said third secondary input has said sixth terminal and an eighth terminal; wherein
   said second secondary circuit comprises:
      a first secondary capacitor and a first secondary inductance wherein said first secondary capacitor is connected in series between said fifth terminal and said first secondary inductance, said first secondary inductance being connected with said third terminal; and
      a first secondary switching means for alternately disconnecting and connecting through a first secondary diode a junction between said first secondary capacitor and said first secondary inductance to a junction between said fourth terminal and said sixth terminal; and wherein said third secondary circuit comprises:
  a second secondary capacitor and a second secondary inductance wherein said second secondary capacitor is connected in series between said eighth terminal and said second secondary inductance, said second secondary inductance being connected with said third terminal; and
  a second secondary switching means for alternatively disconnecting and connecting through a second secondary diode a junction between said second secondary capacitor and said second secondary inductance to a junction between said fourth terminal and said sixth terminal.

5. The DC-to-AC power converter according to claim 3, wherein
  said first AC output has a third terminal and a fourth terminal,
  said second secondary input has a fifth terminal and a sixth terminal;
  said third secondary input has said sixth terminal and an eighth terminal; wherein
  said second secondary circuit comprises:
    a secondary capacitor that is connected in series between said sixth terminal and said fourth terminal;
    a first secondary inductance that is connected in series between said fifth terminal and said third terminal; and
    a first secondary switching means for alternatively disconnecting and connecting through a first secondary diode said fifth terminal to a junction between said secondary capacitor and said fourth terminal; and wherein
  said third secondary circuit comprises:
    said secondary capacitor that is connected in series between said sixth terminal and said fourth terminal;
    a second secondary impedance that is connected in series between said eighth terminal and said third terminal; and
    a second secondary switching means for alternatively disconnecting and connecting through a second secondary diode said eighth terminal to a junction between said secondary capacitor and said fourth terminal.

6. The DC-to-AC power converter according to claim 3, wherein said first secondary input has a ninth terminal and a tenth terminal,
said first DC output has an eleventh terminal and a twelfth terminal; wherein
said isolated transformer has:
a primary winding;
a first, a second, and a third secondary windings, of turn ratios with respect to said primary winding 1:T, 1:N, and 1:N respectively; wherein
said primary winding is connected to said primary output;
said first secondary winding is connected to said first secondary input;
said second secondary winding is connected to said second secondary input;
said third secondary winding is connected to said third secondary input; wherein
said first secondary circuit comprises a diode that is connected in series between said ninth terminal and eleventh terminal;
said tenth terminal is connected to said twelfth terminal; and wherein $$T \le N \frac{VDC}{VoutAC(\max)};$$

wherein VDC is a constant voltage value across said tank capacitor and VoutAC (max) is a peak value.

7. The DC-to-AC power converter according to claim 6, wherein T=

$$T = N \frac{VDC}{VoutAC(\max)}.$$

8. The DC-to-AC power converter according to claim 1, wherein the length of the first time interval and/or of the third time interval is equal to $T_0/10$ or less.

9. The DC-to-AC power converter according to claim 1, wherein the length of the first time interval and/or of the third time interval is equal to $T_0/20$ or less.

10. The DC-to-AC power converter according to claim 1, wherein the length of the first time interval and/or of the third time interval is equal to $T_0/30$ or less.

* * * * *